US006928717B2

(12) United States Patent
Dill

(10) Patent No.: US 6,928,717 B2
(45) Date of Patent: Aug. 16, 2005

(54) SITE FURNISHINGS RECEPTACLE AND METHOD

(75) Inventor: Howard M. Dill, Burnham, PA (US)

(73) Assignee: DuMor, Inc., Mifflintown, PA (US)

( * ) Notice: Subject to any disclaimer, the term of this patent is extended or adjusted under 35 U.S.C. 154(b) by 0 days.

(21) Appl. No.: 10/732,330

(22) Filed: Dec. 10, 2003

(65) Prior Publication Data

US 2004/0117966 A1 Jun. 24, 2004

Related U.S. Application Data

(62) Division of application No. 10/085,402, filed on Feb. 28, 2002, now Pat. No. 6,662,965.

(60) Provisional application No. 60/272,394, filed on Mar. 1, 2001.

(51) Int. Cl.[7] .................. B23P 13/04

(52) U.S. Cl. .................. 29/557; 29/428; 29/407.09; 29/407.1; 29/558

(58) Field of Search .................. 29/428, 557, 558, 29/407.09, 407.1; 220/668, 9.1, 9.4, 676

(56) References Cited

U.S. PATENT DOCUMENTS

| | | | | | |
|---|---|---|---|---|---|
| 303,539 | A | | 8/1884 | Nelson | 220/668 |
| 645,626 | A | | 3/1900 | Mills | 220/668 |
| 908,579 | A | | 1/1909 | Knobloch | 220/676 |
| 1,108,066 | A | | 8/1914 | Cooke et al. | 220/668 |
| 1,230,585 | A | | 6/1917 | Lister | 52/192 |
| 2,060,488 | A | | 11/1936 | Mitchell | 220/676 |
| 2,438,844 | A | | 3/1948 | Dale | 220/676 |
| 2,697,997 | A | * | 12/1954 | Burroughs | 29/407.05 |
| 3,502,204 | A | | 3/1970 | James | 220/668 |
| 3,944,110 | A | * | 3/1976 | Willis | 220/23.83 |
| 4,014,088 | A | * | 3/1977 | Oshier | 29/407.09 |
| 4,023,873 | A | * | 5/1977 | Barker | 312/235.6 |
| 4,694,972 | A | | 9/1987 | Bimonte et al. | 220/401 |
| 4,867,328 | A | * | 9/1989 | McCarthy | 220/533 |
| 5,163,579 | A | * | 11/1992 | Jones | 220/629 |
| 5,183,175 | A | | 2/1993 | Brown | 220/408 |
| 5,186,351 | A | | 2/1993 | Gallo et al. | 220/563 |
| 5,531,352 | A | | 7/1996 | Kraft et al. | 220/675 |
| 5,549,215 | A | | 8/1996 | Cruce et al. | 220/676 |
| 6,000,571 | A | | 12/1999 | Brooks et al. | 220/495.04 |
| 6,253,848 | B1 | | 7/2001 | Reimers et al. | 166/254.1 |
| 6,349,841 | B1 | * | 2/2002 | Basara | 220/62.12 |
| 6,371,296 | B1 | * | 4/2002 | Rumbough | 206/494 |
| 6,401,274 | B1 | * | 6/2002 | Brown | 4/626 |
| 6,662,965 | B2 | * | 12/2003 | Dill | 220/668 |
| 2002/0070224 | A1 | * | 6/2002 | Basara | 220/676 |

OTHER PUBLICATIONS http://www.hypotherm.com/mech_systems/max200.htm, visited Feb. 26, 2001.

http://www.plasma–cutter.com/cnc.htm, visited Feb. 23, 2001.

http://www.hypertherm.com/technology/high_def/htm, visited Feb. 23, 2001.

http://www.maglin.com/product/trash/mlwr200–32.html, visited Feb. 23, 2001.

http://www.davebang.com/furnish3.htm, visited Feb. 25, 2001.

(Continued)

*Primary Examiner*—Essama Omgba
(74) *Attorney, Agent, or Firm*—Hooker & Habib, P.C.

(57) ABSTRACT

A receptacle includes a base and a cylindrical or annular sidewall attached to the base and extending above the base to an open upper end. The sidewall and base define an interior of the receptacle to receive items. The sidewall includes one or more rigid plates spaced along the circumference of the sidewall, and one or more cutouts removed from at least one of the plates to define an ornamental feature in the sidewall. Each cutout is formed by cutting and defined by a cut edge extending along the periphery of the cutout. The cutouts can be torch-cut under automatic control.

10 Claims, 2 Drawing Sheets

OTHER PUBLICATIONS http://www.francesandrew.com/receptacles.htm, visited Feb. 25, 2001.

http://www.victorstanley.com/html/prod/ironsites–s42.html, visited Feb. 25, 2001.

http://www.dumor.com/102mreceptacle.html, visited Feb. 25, 2001.

http://www.dumor.com/80ashurn.html, visited Feb. 25, 2001.

http://www.witt.com/NR.OR.pop.html, visited Feb. 25, 2001.

http://www.amico–online.com/products/expanded__metal__.

industrial$_{13}$ flooring/html__files/ifproducts.htm, visited Feb. 25, 2001.

http://www.wirecloth.cc/expandedmetal.htm, visited Feb. 25, 2001.

http://tpub.com/engbas/7–6.htm, visited Feb. 25, 2001.

* cited by examiner

SITE FURNISHINGS RECEPTACLE AND METHOD

This application is a divisional application of currently application Ser. No. 10/085,402, filed Feb. 28, 2002, now U.S. Pat. No. 6,662,965, and claims the benefit of U.S. Provisional Application No. 60/272,394, filed Mar. 1, 2001.

FIELD OF THE INVENTION

This invention relates to receptacles used as site furnishings and a method of manufacturing such receptacles.

BACKGROUND OF THE INVENTION

Receptacles used as site furnishings include trash receptacles, ash urns for disposing tobacco ash and tobacco products, planters, and the like. They are typically used in amusement parks, sports arenas, airports, picnic grounds and other public venues. These venues often have large numbers of visitors that subject the receptacles to heavy use. The receptacles are also commonly exposed to the weather.

The receptacles must have durable, rugged construction to provide an economically long service life. Yet the appearance of the receptacles is as important as their utilitarian function and construction. The receptacles should enhance the appearance of the venue and work harmoniously as a design element in the overall feel or theme of the landscape architecture or site design.

Conventional receptacles used for site furnishings have a metal frame that may house a replaceable plastic or metal liner. The frame has a base that supports the liner. A cylindrical sidewall extends upwardly above the base to an open upper end. The base typically has a circular or rectangular periphery that defines the cross-sectional shape of the sidewall. Upper and lower end rings or bands surround the upper and lower ends of the sidewall respectively and provide structural reinforcement at the ends of the sidewall.

The sidewall must be strong and durable, and yet have a pleasing appearance. The sidewall is usually fabricated by one of three known methods. Although each method can produce a strong and durable receptacle, each method is limiting in the ornamental designs that can be achieved by such method.

In one method the sidewall is formed from a number of individual, separate structural members. These members may be bars, rods, or plates made from metal, wood, fiberglass or plastic. The individual members extend axially between the end bands and are individually fastened to the end bands. Additional members may extend circumferentially between the axial members.

This method of sidewall construction is labor intensive and is suitable only for relatively simple ornamental designs. Forming and assembling individual members into more complex or more fanciful designs is expensive.

In a second method the sidewall is formed from expanded metal or welded wire mesh. Expanded metal is metal sheet simultaneously slit and stretched into a grid having a non-raveling, open mesh. Welded wire mesh typically has a rectangular mesh pattern. The ornamental design of receptacles formed from expanded metal or wire mesh is dominated by the diamond or rectangular mesh pattern.

A third known method of fabricating the receptacle body is casting the body from aluminum or iron. Patterns and molds are required. Melted aluminum or cast iron is flowed into the molds and cooled to solidify and form the cylinder body. Aluminum is expensive and cast iron receptacles can be heavy. Cast receptacles, therefore, have limited markets.

Thus there is a need for an improved method of fabricating receptacles used as site furnishings. The method should not be labor intensive, nor require the use of expensive or particularly heavy materials. The improved method should make commercially feasible the manufacture of receptacles having unique ornamental designs that are impractical to manufacture using conventional methods.

SUMMARY OF THE INVENTION

The invention is directed to an improved receptacle and an improved method for manufacturing a receptacle.

A receptacle having features of the present invention includes a base, a cylindrical or annular sidewall attached to the base and extending above the base to an open upper end, the sidewall and base defining an interior of the receptacle to receive items in the receptacle, the sidewall including one or more sheets or plates spaced along the circumference of the sidewall, and one or more cutouts removed from at least one of the plates to define an ornamental feature in the sidewall, each cutout defined by a cut edge extending along the periphery of the cutout and formed by cutting the cutout from the one or more plates.

In one possible embodiment, the sidewall has a single sheet or plate substantially defining the entire circumference of the sidewall, the plate having adjacent first and second outer edges extending the height of the sidewall and forming a seam extending along the height of the sidewall. Cutouts can be cut entirely within the interior of the plate, or may extend into the interior from an exterior edge of the plate. In possible variant embodiments one or more cutouts can extend across the first and second edges, each cutout having a first cutout portion extending from the first edge into the interior of the plate and a second cutout portion extending from the second edge into the interior of the plate.

In yet another embodiment, the sidewall includes a plurality of adjacent sheets or plates extending about the circumference of the sidewall. Each plate has opposed first and second outer edges adjacent an adjacent plate and extending along the height of the sidewall. The plates can be rigidly connected to an adjacent plate or plates to form a rigid sidewall or, in an alternative embodiment, one plate is pivotally mounted to an adjacent sheet or plate or plate portion to form a door. A cutout can be cut entirely within the interior of a plate or can extend across adjacent plates, a first portion of such cutout in one plate and a second portion of such cutout in the other plate.

Preferably the sheets or plates are solid metal and may be of uniform thickness. However, in other possible embodiments the sheets or plates may be non-solid sheets or plates formed from expanded metal, welded wire and the like, or may be combinations of solid and non-solid sheets or plates.

The following features may be found alone or in combination in yet other embodiments of receptacles made in accordance with the present invention. Each cutout may be defined by a plasma torch-cut edge of the plate. The one or more plates may be cold-formed or cold-rolled from flat plates. The one or more plates may each have a bottom edge portion adjacent the base and an opposite top edge portion, the cutouts not extending into the top or bottom edge portions so as to form continuous top and bottom sidewall edge portions. Top and bottom reinforcing structure, such as end rings or end plates, can be fixedly attached to respective edge sidewall portions. The receptacle may include conventional lids (for example, generally planar plastic or spun metal lids, dome lids, funnel lids or ash tray lids), ash trays, plant pots, and metal or plastic trash bag liners. The receptacles can be free-standing or can be adapted for mounting on a pole or other mounting member in a conventional manner. Adjacent sidewall seams may be welded or mechanically fastened together. The sidewall may be formed from steel or aluminum sheets or plates. The sidewall cross-section may be shaped as a circle, oval, arc, triangle, polygon (for example, square, rectangle, pentagon or hexagon) or some combination of straight and arcuate or curved periphery segments.

In preferred embodiments of the improved receptacle, the sidewall is an exterior sidewall having an inner surface facing the interior of the receptacle and an outer surface facing the outside of the receptacle. An interior sidewall is located in the interior of the exterior sidewall and overlies cutouts in the exterior sidewall. The interior sidewall has an outer surface facing the inner surface of the exterior sidewall, the inner and outer sidewalls closely conforming with each other to enable the sidewalls to be touching or very closely spaced together. The exterior sidewall is preferably finished in a first color and the interior sidewall is preferably finished in one or more contrasting second colors to highlight the portions of the inner sidewall visible through the cutouts in the outer sidewall. The interior sidewall is preferably made from the same material as the exterior sidewall but may have a different thickness or construction (as for example, solid sheet or plate, expanded metal or welded wire) than the exterior sidewall.

Preferably the interior sidewall includes one or more solid sheets or plates that extend continuously about the inner periphery of the exterior sidewall. Such sheets or plates may be cold-formed from flat plates or sheets. In yet other embodiments of the present invention the interior sidewall may include separate and spaced apart members, each member adapted to overlie one or more cutouts. In yet other embodiments the interior sidewall may have cutouts.

A method of manufacturing a receptacle in accordance with the present invention includes the steps of cutting along a periphery one or more cutout patterns in a sheet or plate to form cutouts in such sheet or plate, forming such sheet to conform with at least a portion of a periphery of a base, and attaching the sheet or plate to the base, the formed sheet extending along and conforming to such base periphery portion.

Preferably the cutting step includes plasma cutting the periphery of the one or more cutout patterns in a metal sheet or plate. The sheet or plate may be aluminum or steel.

Preferably the forming step includes cold forming the sheet or plate from flat sheet or plate.

Preferably the attaching step includes welding the sheet or plate to the base. Preferably the cutting step is performed prior to the forming step.

Preferred embodiments of the inventive method include inputting data representing the periphery of the one or more cutout patterns to a memory device, storing the data, and automatically controlling a cutter in accordance with such data to cut the cutouts. The inputting step may include inputting data representing a number of sets of data representing the periphery of one or more cutout patterns and the storing step may include storing such sets of data, and the method may further include selecting one set of the stored data sets.

In yet other possible embodiments of the inventive method the cutting step includes cutting a first periphery portion of a cutout and cutting a second periphery portion of such cutout spaced from and not contiguous with the first periphery portion. Cutting the first and second periphery portions may include cutting such periphery portions in the same sheet or plate or may comprise cutting the first and second periphery portions in different sheets or plates.

Yet other preferred embodiments of the inventive method may include the steps of cold forming one or more additional sheets or plates, overlying such one or more additional sheets or plates over one or more cutouts on an inner side of the one or more sheets, and coating or treating the one or more one or more of the cutouts with a color or finish contrasting to the color or finish of the exterior sidewall.

A receptacle having features of the present invention has a number of advantages over conventional receptacles used for site furniture. The cutouts can have arbitrary perimeter shapes, providing the receptacle designer great flexibility in developing ornamental designs for the receptacle sidewall.

The following example cutout designs are meant to be illustrative, and not limiting the scope of the invention: letters of the alphabet, the letters perhaps forming words or initials, the words or initials relating to the intended venue or purchaser of the receptacle or identifying the trademark or trade name of the receptacle manufacturer; the outline of logos or trademarks; regular geometric shapes; fanciful shapes, as for example, silhouettes of persons, skylines, or animals; or freeform shapes; or any combinations thereof.

Having an interior sidewall cover the cutout portions of the exterior sidewall creates a "3-D effect" that accentuates the cutout portions. The effect can be emphasized by having the interior sidewall exhibit a contrasting finish. The contrasting finish could be formed by a contrasting color, material or construction with respect to the exterior sidewall. Providing a contrasting finish provides even greater ornamental design flexibility for the receptacle designer. For example, the contrasting colors could be the colors associated with a sports team or university (for example, blue and white representing the colors of the Pennsylvania State University), or the cutout could be of an outline of a logo and the interior sidewall overlying the outline could be finished or painted with the logo.

A method of manufacturing a receptacle having features of the present invention has a number of advantages over conventional methods of manufacturing receptacles. Economical, light weight flat metal sheets or plates can be used, reducing material inventory. The sheets or plates can be cold formed to assemble with the base and can be formed to follow base peripheries having varied shapes.

The cutouts can be cut from the sheet or plate with a conventional plasma cutting machine. The cutting machine can be computer numerically controlled and automated, with an accompanying reduction in labor cost. A library of predetermined sets of cutout patterns can be developed and stored. The choice of set can be made at the time of manufacture and it would not be necessary to special order bars, rods or other structural members in advance that can be used only for one or a limited number of ornamental designs. Limited production runs of custom order designs are commercially feasible.

New cutout patterns can be developed quickly in response to market demand or for custom to-order manufacture. Customized cutout patterns enables receptacles to have ornamental designs targeted specifically for a site. For example, receptacles at a football stadium could have the team logo or team name cut in the receptacle sidewall.

Other objects and features of the invention will become apparent as the description proceeds, especially when taken in conjunction with the accompanying drawings illustrating the invention, of which there are 2 sheets of three embodiments.

DESCRIPTION OF THE PREFERRED EMBODIMENTS

Figure 1:
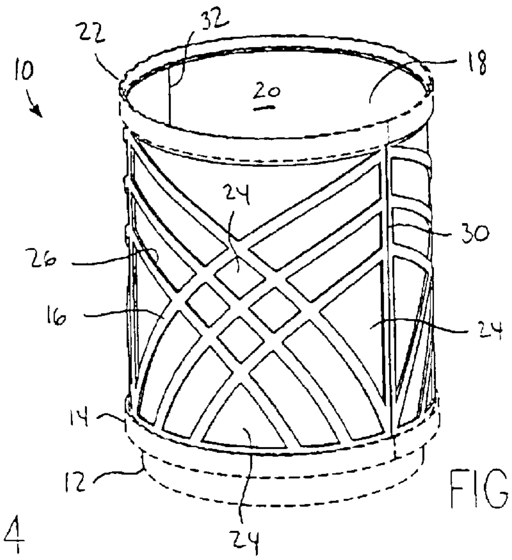
FIG. 1 is a perspective view of a 32-gallon trash receptacle in accordance with the present invention.
Figure 4:
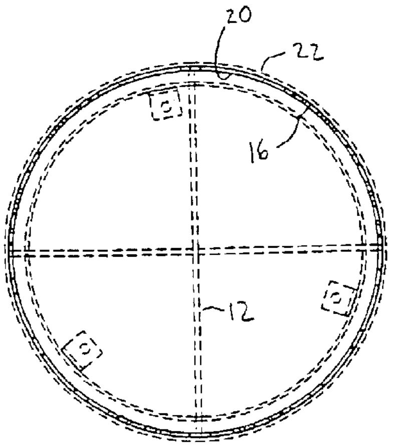
FIG. 4 is a top view of the receptacle shown in FIG. 1.
Figure 3:
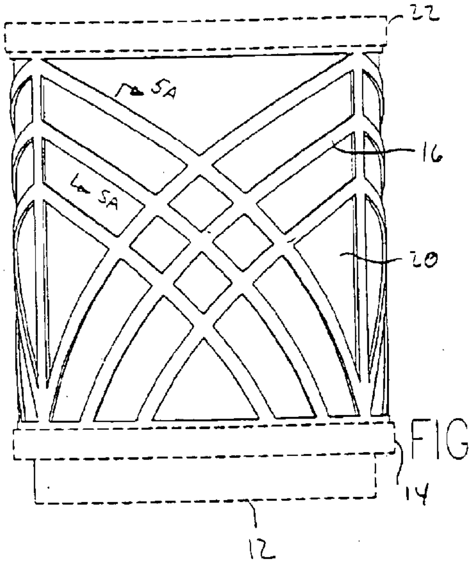
FIG. 3 is a side view of the receptacle shown in FIG. 1.
Figure 2:
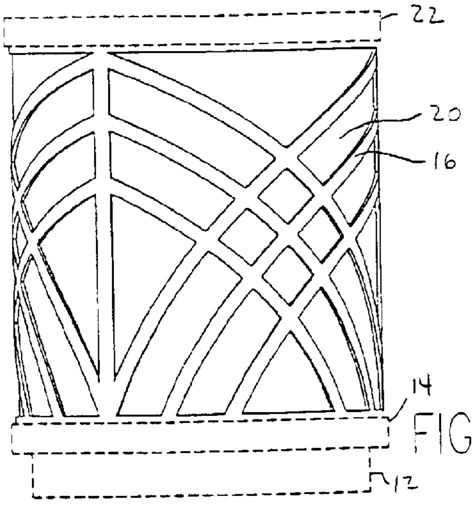
FIG. 2 is a front view of the receptacle shown in FIG. 1.
Figure 5A:
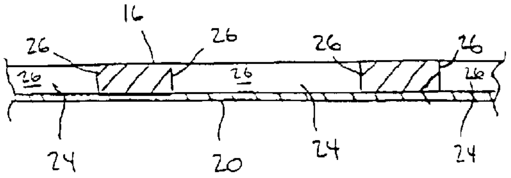
FIG. 5A is a sectional view taken generally along line 5A—5A shown in FIG. 3.
Figure 5:
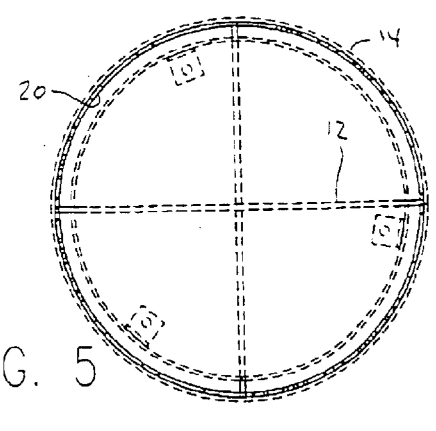
FIG. 5 is a bottom view of the receptacle shown in FIG. 1.

FIGS. 1–5 and 5A illustrate a first embodiment receptacle 10 in accordance with the present invention. The illustrated receptacle 10 is a 32 gallon, free-standing trash receptacle and has overall height and width dimensions substantially the same as a conventional 32 gallon trash receptacle.

The receptacle 10 includes a base 12 defining a circular periphery, and a bottom end ring 14 attached to the base surrounding the periphery of the base. The base 12 includes conventional structure to enable the receptacle to be free-standing. An exterior sidewall 16 is welded to the inside of the bottom ring 14 and extends away from the base to an open upper end. The base and sidewall 16 define an interior 18 of the receptacle for holding a conventional liner (not shown). An interior sidewall 20 immediately adjacent the exterior sidewall 16 also extends from the bottom ring 14 to the open end of the receptacle. A top end ring 22 is welded to the top of the exterior sidewall 16. The base 12 and rings 14, 22 are conventional, shown in phantom in the figures, and are not described in further detail.

The exterior sidewall 16 is formed from one solid, homogenous cold formed steel plate as will be described in greater detail below. The sidewall 16 includes a number of cutout portions 24, each cutout portion defined by a cut edge 26 of the plate bounding the cutout portion. The remaining plate portions between the cutout portions 24 form an ornamental design. The ornamental design shown is representational only and other ornamental designs are possible.

The sidewall 16 conforms to the circular periphery of the base. The opposed lateral edges of the plate forming the sidewall 16 are joined at a weld seam 30.

The interior sidewall 20 is also formed from one solid, homogenous cold formed steel plate. The opposed lateral edges of the plate forming the sidewall 20 are joined at a weld seam 32. The sidewall 20 has no cutouts. The outer facing side or face of the sidewall 20 conforms closely with the inner facing side or face of the sidewall 16 with no substantial gap between the two sidewalls to collect trash or rain water. The sidewall 20 overlies and covers each and every cutout portion 24 in the sidewall 16.

Preferably the exterior sidewall 16 is finished in a first color and the interior sidewall 20 is finished in a second, contrasting color. Each sidewall can be finished in a conventional manner, including paint, powder coatings and the like. If desired, the portions of the interior sidewall 20 seen through the cutouts 24 can each be finished with a different color or otherwise individually finished as desired.

Figure 6:
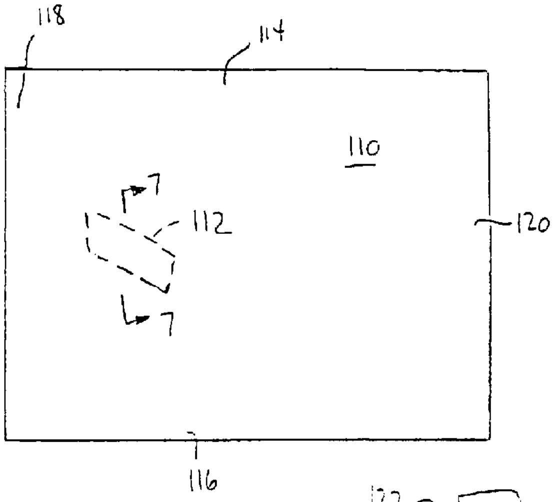
FIG. 6 illustrates schematically plasma cutting along the periphery of cutout patterns in a flat plate to form the cutouts in the exterior sidewall of the receptacle shown in FIG. 1.

FIG. 6 illustrates schematically a step in the method of manufacturing the exterior sidewall 16. In this embodiment the sidewall 16 is formed from a quarter-inch thick flat, rectangular steel plate 110. Shown is a top face of the plate 110, and in dashed lines is a closed periphery 112 of a cutout portion 24 prior to cutting the cutout portion 24. In this embodiment the upper and lower plate portions 114, 116 and lateral edge portions 118, 120 are not cut out and the outer edges of the plate are not cut. This provides a continuous circumferential ring of plate material for attachment to the end rings 14 and 22, and a continuous length of weld seam 30 extending along the height of the sidewall.

Preferably the cutouts are cut from the plate 110 by a plasma cutter 122 (see FIG. 7), although other types of cutters could be used. The plasma cutter can be a Hypertherm Model Max200 high capacity, dual-gas plasma cutting system available from Hypertherm Inc., Hanover, N.H. 03755, or equivalent.

Figure 7:
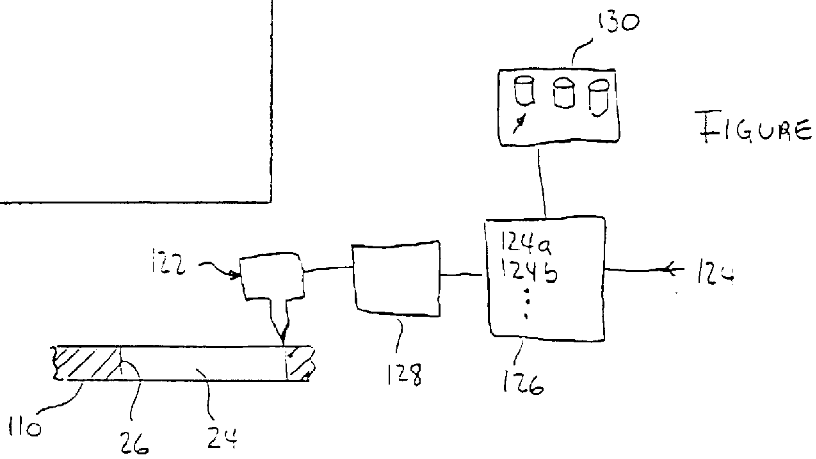
FIG. 7 is a view taken generally along line 7—7 of FIG. 6 after cutting a cutout in the plate.

The plasma cutter 122 cuts along the periphery 112 to form the cutout 24 and forms the cut edges 26 defining the cutout 24. FIG. 7 is a sectional view of a cutout illustrating cut edge 26 immediately after cutting by the plasma cutter 122.

Preferably the plasma cutter 122 is a computer numerical controlled (CNC) plasma cutter that fully automates the cutting process. Data 124 representing the periphery of the cutout patterns can be stored in a memory device 126 and retrieved by a computer or controller 128 for controlling the cutter. The data 124 may be one of a number of data sets 124*a*, 124*b* and the like inputted into and stored in memory 126 for different ornamental designs or for different sizes of sheet or plate. An operator may select one of the stored data sets 124, 124*a*, 124*b* from a computer display screen 130, which display can present in graphical form the plate and the cutouts on the plate or could alternatively display graphical views of the finished receptacles or sidewalls.

After the cutter 122 cuts the cutouts from the plate, the plate 110 is cold formed to the required shape to form the sidewall 16. In this embodiment the plate 110 and a similar 18 gauge steel sheet are each rolled into a circular cylinder and the cylinder seams are welded to form the exterior sidewall 16 and interior sidewall 20 respectively. Cold form rolling is conventional and so is will not be described further.

In other embodiments the plate and sheet can be formed into other cross section shapes. If necessary, the plate can be heat treated or annealed in a known manner before or after the forming step if cold forming is not desired or is impractical. The sidewall 16 and sidewall 20 are then assembled with the upper and lower end rings. The sidewall 16 can be assembled with the base and end rings in the same way as would a conventional expanded metal sidewall. A conventional lid and liner can be installed.

Figure 8:
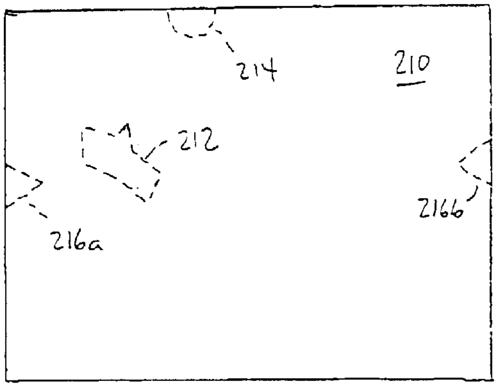
FIG. 8 illustrates schematically the periphery of cutout patterns for a plate similar to the plate shown in FIG. 6, the plate for forming an exterior sidewall of a second embodiment receptacle in accordance with the present invention.
Figure 9:
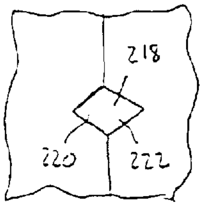
FIG. 9 is a partial front view of the exterior sidewall formed from the plate shown in FIG. 8.

FIG. 8 illustrates a plate 210, like plate 110, for a second embodiment receptacle. Shown in dashed lines are a closed cutout periphery 212, a cutout periphery 214 at a top edge of the plate 210 and first and second cutout peripheries 216*a* and 216*b* at opposed lateral edges of the plate. When the plate 210 is formed into a cylinder, a cutout 218 is cooperatively formed from the cutouts formed by cutting along the peripheries 216*a* and 216*b*. See FIG. 9. The cutout 218 includes a first cutout portion 220 formed from cutting periphery 216*a* and a second cutout portion 222 formed from cutting periphery 216*b*.

Figure 10:
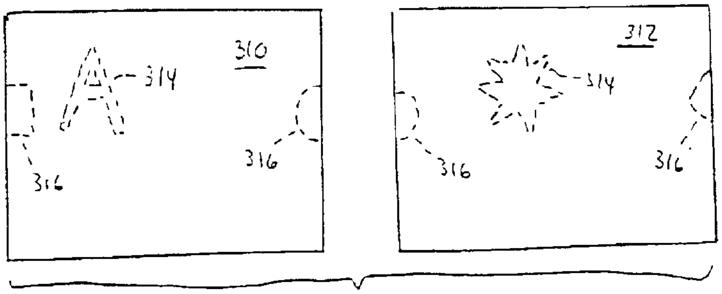
FIG. 10 illustrates schematically the periphery of cutout patterns in two flat plates that will comprise portions of an exterior sidewall of a third embodiment receptacle.

FIG. 10 illustrates plates 310 and 312 for a third embodiment receptacle. In this embodiment the exterior sidewall is formed from at least the two plates 310 and 312. Each plate 310, 312 has a number of cutout peripheries 314 entirely within each plate and edge cutout peripheries 316 that cooperate to form a cutout when the plates are joined together to form the exterior sidewall. Each plate 310, 312 will extend about a portion of the base periphery. The plates do not have to be identical. One plate may be pivotally mounted or hinged to another plate to form a door for access to the interior of the receptacle.

The interior sidewall can be formed from one metal sheet as embodied in receptacle 10 or can be formed from a plurality of sheets. In other possible embodiments the interior sidewall can be formed from a number of separate sheets or plates, each sheet or plate overlying one or more cutouts in the exterior sidewall. This permits, for example, interior sidewall members to move with a door formed in the exterior sidewall. The same cutter that cuts out the cutout portions of the exterior sidewall can cut out the individual interior sidewall members from a sheet or plate if desired.

In yet other possible embodiments the interior sidewall can have cutouts in portions that overlie the exterior sidewall. A liner preferably finished in a third contrasting color could be viewed from the exterior of the receptacle through overlapping cutout portions in the interior and exterior sidewalls. Alternatively, the interior and exterior cutout portions could be configured not to overlap. The inner face of the exterior sidewall could be viewed through the interior sidewall cutouts if the receptacle is used without a liner or lid. Additional ornamental effects can thus be created.

While I have illustrated and described preferred embodiments of my invention, it is understood that this is capable of modification, and I therefore do not wish to be limited to the precise details set forth, but desire to avail myself of such changes and alterations as fall within the purview of the following claims.

What I claim as my invention is:

1. A method of manufacturing a site furnishings receptacle having a base and an annular sidewall defining an interior of the receptacle, the sidewall extending away from the base to an open upper end, the method comprising the steps of:

providing one or more rigid plates for forming the sidewall of the receptacle;

cutting a cutout in at least one of the provided plates and removing the cutout material, the cutout extending through the thickness of such cut plate or plates and bounded by cut edges of such cut plate or plates;

assembling the one or more rigid plates to form the sidewall of the receptacle;

attaching the sidewall to the base to form the receptacle; and overlying the cutout with a surface, the surface closely spaced from and overlying the cutout, the surface on a member attached to the base or sidewall.

2. The method of claim 1 wherein the cutting step comprises cutting the cutout with a plasma torch.

3. The method of claim 1 wherein the assembling step comprises the step of forming at least one of the rigid plates from a first shape to a second shape different from the first shape, the second shape defining at least a portion of the sidewall.

4. The method of claim 3 comprising the step of cold forming the at least one plate.

5. The method of claim 3 wherein the cutting step is performed prior to the assembly step.

6. The method of claim 1 wherein the shape of the cutout is represented by a cutout pattern, the method further comprising the steps of:

inputting data representing the cutout pattern to a memory device;

storing the data in the memory device; and retrieving the stored data from the memory device and automatically controlling the cutting step in accordance with the retrieved data to form a cutout in a shape corresponding to the cutout pattern.

7. The method of claim 6 wherein:

the inputting step comprises the step of inputting a plurality of sets of data, each data set representing a respective cutout pattern;

the storing step comprises the step of storing the plurality of data sets in the memory device; and the retrieving step comprises the step of retrieving at least one of the data sets from the memory device.

8. The method of claim 1 wherein the cutout comprises a first cutout portion and a second cutout portion, the first and second cutout spaced apart from each other and not contiguous with one another during the cutting step.

9. The method of claim 1 wherein the method comprises the step of forming finish on the overlying surface that contrasts with a finish on the portion of the sidewall adjacent the cutout.

10. The method of claim 9 wherein the providing step comprises the step of providing a solid metal plate, an expanded metal plate or a welded wire plate.

* * * * *

UNITED STATES PATENT AND TRADEMARK OFFICE

CERTIFICATE OF CORRECTION

PATENT NO. : 6,928,717 B2 
DATED : August 16, 2005
INVENTOR(S) : Howard M. Dill

It is certified that error appears in the above-identified patent and that said Letters Patent is hereby corrected as shown below:

Title page,
Item [56], References Cited, OTHER PUBLICATIONS, replace “industrial13flooring” with -- industrial_flooring --.

Column 3,
Line 38, insert -- of -- between “periphery” and “one”.

Signed and Sealed this

Twenty-fifth Day of October, 2005

JON W. DUDAS
*Director of the United States Patent and Trademark Office*